United States Patent
Werdell et al.

(10) Patent No.: US 10,511,969 B2
(45) Date of Patent: Dec. 17, 2019

(54) UNTRUSTED DEVICE ACCESS TO SERVICES OVER A CELLULAR NETWORK

(71) Applicant: T-Mobile USA, Inc., Bellevue, WA (US)

(72) Inventors: Joel Werdell, Seattle, WA (US); James D. Ellison, Issaquah, WA (US); Phi Nguyen, Lacey, WA (US); Robert Stamm, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 67 days.

(21) Appl. No.: 15/697,385

(22) Filed: Sep. 6, 2017

(65) Prior Publication Data

US 2018/0077573 A1    Mar. 15, 2018

Related U.S. Application Data

(60) Provisional application No. 62/384,663, filed on Sep. 7, 2016.

(51) Int. Cl.
| | |
|---|---|
| *H04W 4/00* | (2018.01) |
| *H04W 12/06* | (2009.01) |
| *H04W 8/18* | (2009.01) |
| *H04W 12/08* | (2009.01) |
| *H04W 68/00* | (2009.01) |
| *H04L 29/06* | (2006.01) |
| *H04L 29/08* | (2006.01) |
| *H04W 76/10* | (2018.01) |

(52) U.S. Cl.
CPC .............. *H04W 12/06* (2013.01); *H04L 63/08* (2013.01); *H04L 67/14* (2013.01); *H04W 8/18* (2013.01); *H04W 12/08* (2013.01); *H04W 68/005* (2013.01); *H04W 76/10* (2018.02); *H04L 2463/082* (2013.01)

(58) Field of Classification Search
CPC ............................. H04W 12/06; H04W 12/00
See application file for complete search history.

(56) References Cited

U.S. PATENT DOCUMENTS

| | | |
|---|---|---|
| 9,147,054 B1 | 9/2015 | Beal et al. |
| 2004/0111369 A1 | 6/2004 | Lane et al. |
| 2006/0002556 A1 | 1/2006 | Paul |

(Continued)

OTHER PUBLICATIONS

International Search Report and Written Opinion for PCT Application No. PCT/US2017/050508, dated Dec. 14, 2017.

(Continued)

*Primary Examiner* — Omoniyi Obayanju
(74) *Attorney, Agent, or Firm* — Han Santos, PLLC (57) ABSTRACT

Cellular networks regularly operate with trusted devices, which typically are trusted because of the integration of a SIM card therewith. Untrusted devices typically do not interface with a SIM card, and rely on user input through traditional user interfaces for authentication. Recently, the use of hands-free, always-on digital assistant devices have become more common. Such devices typically have only a voice user interface that may be used by a number of people in close proximity to the device. Particular problems arise in such a scenario when a user wants to access a secure service that requires user authentication. Such problems are addressed with multiple techniques described herein.

20 Claims, 7 Drawing Sheets

(56) References Cited

U.S. PATENT DOCUMENTS

| | | | |
|---|---|---|---|
| 2006/0190991 A1* | 8/2006 | Iyer | H04L 63/083 726/3 |
| 2008/0037500 A1 | 2/2008 | Andrus et al. | |
| 2011/0066985 A1* | 3/2011 | Corbin | G06F 3/04883 715/863 |
| 2011/0275348 A1 | 11/2011 | Clark et al. | |
| 2013/0046984 A1 | 2/2013 | Lucidarme et al. | |
| 2014/0201335 A1 | 7/2014 | Wang | |
| 2014/0274008 A1* | 9/2014 | Olodort | H04M 1/006 455/417 |
| 2014/0297528 A1 | 10/2014 | Agrawal et al. | |
| 2014/0310416 A1* | 10/2014 | Durbha | H04L 47/70 709/225 |
| 2015/0058447 A1 | 2/2015 | Albisu | |
| 2015/0095986 A1 | 4/2015 | Karpey et al. | |
| 2016/0119377 A1 | 4/2016 | Goldberg et al. | |
| 2017/0133011 A1 | 5/2017 | Chen et al. | |
| 2017/0201524 A1 | 7/2017 | Dureau | |
| 2017/0255446 A1 | 9/2017 | Malatesha et al. | |
| 2017/0359334 A1* | 12/2017 | Maddox | G06F 3/16 |
| 2018/0007060 A1 | 1/2018 | Leblang et al. | |
| 2018/0218137 A1 | 8/2018 | Park | |

OTHER PUBLICATIONS

U.S. Appl. No. 15/645,458, Non-Final Office Action dated Jan. 24, 2019, 20 pages.

* cited by examiner

UNTRUSTED DEVICE ACCESS TO SERVICES OVER A CELLULAR NETWORK

BACKGROUND

The present ubiquity of wireless networks, such as cellular networks and Wi-Fi networks, have created a market for devices that communicate via those networks. Examples of business communications include machine to machine (M2M) network clients such as remote cameras to security operations centers and vending machines networked to inventory servers via wireless networks.

Use cases are not limited to business contexts, but also extend to consumer contexts as well. For example, many client devices beyond cellular phones make use of cellular networks. Examples include tablets that enable communications over cellular networks such as cellular enabled Apple iPad® tablets and Android® tablets.

However, tablet and other similar clients are endpoints to the cellular network. That is to say, they are clients of the cellular network itself. Accordingly, such clients may access services of the cellular network by participating in cellular security standards such as via Subscriber Interface Module (SIM) card settings or account settings such as T-Mobile ID®.

Some clients do not participate over a cellular network. For example, a cellular network subscriber may access account information via his or her personal computer (PC). However, because the subscriber authenticates himself or herself via entering a password known to the cellular network, the subscriber's PC becomes trusted to the cellular network. In many cases, the subscriber may access account information via his or her cell phone itself, which is trusted to the cellular network, or may make use of multi-factor authentication via message to the cellular phone thereby making his or her PC trusted to the cellular network.

Presently, there has arisen a class of untrusted clients that do not participate directly over a cellular network, yet have a need to access cellular network services. Such access to cellular network services may be known as untrusted device access. One example of such an untrusted device is the Amazon Echo®, a device that, typical of a growing number of devices, enables voice commands and user intent recognition via speech recognition technologies.

Another characteristic of such devices is that they are typically used in an environment that can include more than one person, making it difficult to authenticate a particular user without allowing access to secure services and/or information by anyone in the immediate vicinity of the device.

Accordingly, there is a need to create secure untrusted device access as described below.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to techniques for untrusted device access to services over a cellular network. The term "untrusted device access," as used herein, may be understood as the secure interfacing of an untrusted device to internal architecture infrastructure components of a cellular network. Although techniques exist to entrust devices to secure network resources, there are concerns that arise with the use of an untrusted device with a voice user interface, also known as a natural language interface. The following discussion, with reference to several figures, brings to light some considerations in this regard, and describes particular solutions for such types of devices.

The novel techniques presented herein are described in detail, below, with respect to several figures that identify elements and operations used in systems, devices, methods, computer-readable storage media, etc., that implement the techniques.

Example Network Environment

Figure 1:
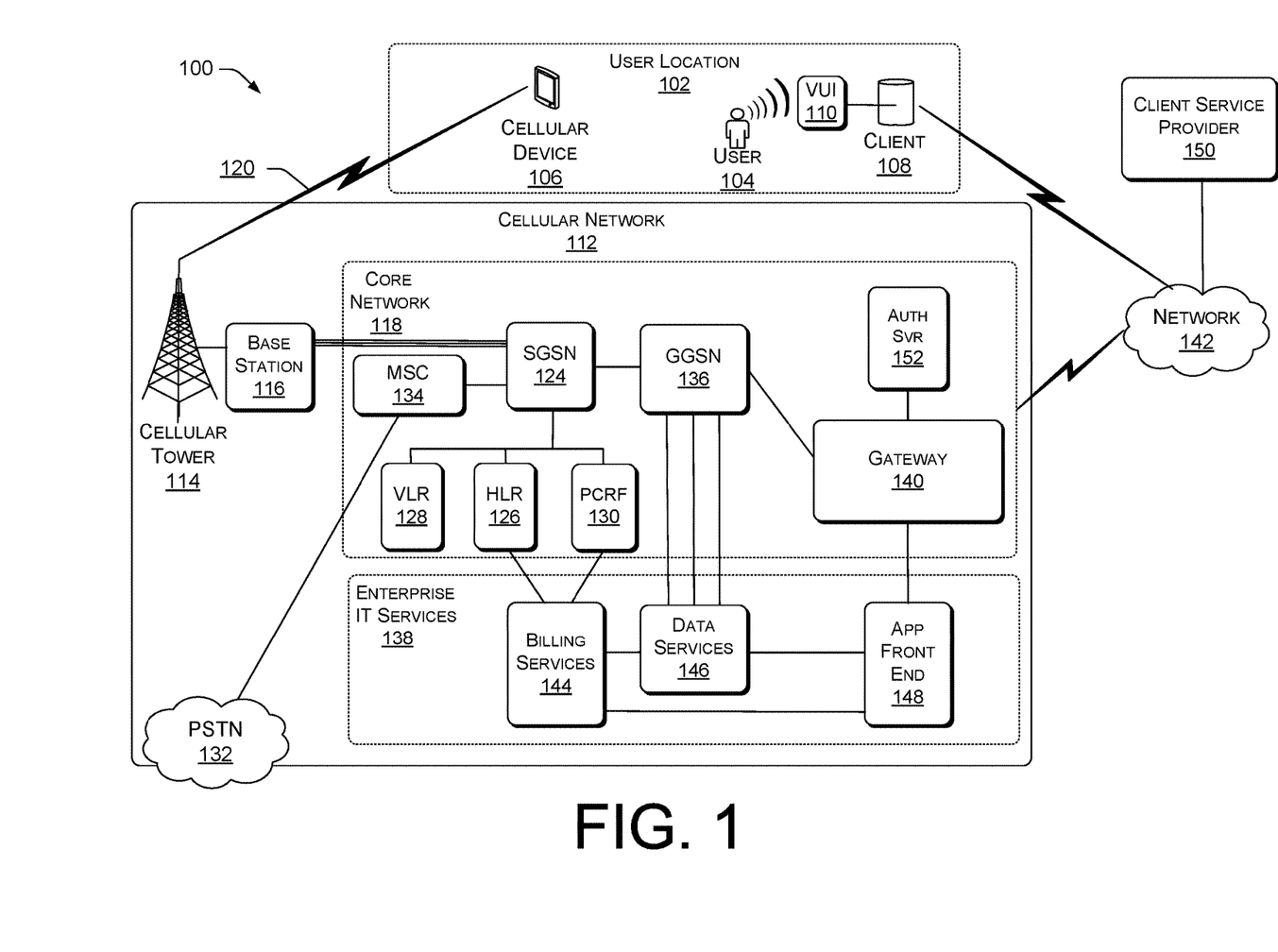
FIG. 1 is a diagram of an example network environment in which the technological solutions described herein may be implemented.

FIG. 1 is a diagram of an example network environment 100 in which the technological solutions described herein may be implemented. FIG. 1 illustrates the context of an untrusted client with a 3GPP (Third Generation Partnership Project, referred to hereinafter as simply "3G") cellular network. It is noted that, although the present discussion refers to a 3G cellular network, other cellular network architectures (e.g., 3GPP2, 4G, 5G, etc.) may be used in place of the 3G cellular network(s) described herein.

The network environment 100 depicts a user location 102 (typically a user's home), which includes a user 104 and one or more devices typically associated with a user, such as a cellular device 106 (also known as "user equipment"), e.g., a cellular smartphone, a tablet with cellular access, a cellular enabled modem, etc.

The user location 102 also includes an untrusted client 108. The untrusted client 108 can be any untrusted electronic device capable of communicating with a network. For purposes of the present discussion, the untrusted client 108 is one that includes a voice user interface (VUI) 110 and, in some cases, may not include any other type of user interface. The untrusted client 108 may comprise a digital assistant type of device, such as an Amazon® Echo® device, a Google Home® device, an Apple® Siri® device, and the like. Such devices typically communicate with a user by way of a voice user interface, and are typically virtually always on, as they are typically in a listening mode waiting for a user voice command.

The network environment 100 further includes a cellular network 112, which is shown as including a cellular tower 114, a base station 116, and a core network 118. The cellular device 106 wirelessly connects to the cellular tower 114 by way of an air interface 120, which constitutes a wireless protocol to communicate with the cellular tower 114 and the base station 116. Example protocols include the modern versions of Code Division Multiple Access (CDMA), Time Division Multiple Access (TDMA), and Long Term Evolution (LTE). The base station 116 then communicates to the core network 112 via physical information carriers consisting of fiber, wire, microwaves, and the like, via one or more backhaul line(s) 122.

The core network 118 provides the switching and routing capabilities of the cellular network 112. The one or more backhaul lines 122 feed into a Serving GPRS (General Packet Radio Service) Support Node (SGSN) 124, which handles voice communications. The SGSN 124 is connected to a Home Location Register (HLR) 126 that stores user account information, a Visitor Location Register (VLR) 128 that stores records of users roaming in cells serviced by the base station 116 and other base stations (not shown) that feed into the SGSN 124, and a Policy and Charging Rules Function (PCRF) 130, which stores subscriber consumer policies such as billing rules.

The SGSN 124 generally performs routing to land lines in a Public Switched Telephone Network (PSTN) 132 via a mobile switching center (MSC) 134 and to other cellular subscribers via one or more other SGSN. For data services—such as e-mail, messaging, voicemail, etc.—the SGSN 124 forwards communications to a Gateway GPRS Support Node (GGSN) 136, which forwards data requests to local enterprise information technology (EIT) services 138 or via a gateway 140 to an external network 142, such as the Internet.

The EIT services 138, as shown, include billing services 144, data services 146 (voice mail, e-mail, SMS messaging, etc.), and an application front end server 148. The billing services 144 may access the HLR 126 and the PCRF 130 for billing applications. The data services 146 may access the billing services 146, and may be called from the GGSN 136 or from the application front end server 148, when accessed from outside the cellular network 112 via the gateway 140.

The EIT services 138 comprise a set of services which are not necessarily accessed via an SGSN 124 and/or GGSN 136. Requests via the gateway 140 can go directly to an enterprise application server, which may or may not be connected to the SGSN 123 or to the GGSN 136. In this way, cellular infrastructure can appear to be an ordinary Internet service endpoint.

The untrusted client 108, does not participate directly in a cellular network. It does not carry a SIM card, nor does it communicate with base stations. Rather, the untrusted client 108 and similar devices typically connect via the user's 104 local network, typically via a Wi-Fi access point (not shown) connected to an Internet Service Provider (ISP) (not shown) via a modem (not shown). The ISP in turn connects the untrusted client 108 to the Internet (network 142). The untrusted client 108 generally may access other services, such as speech recognition processing available via a untrusted device client service provider 150 or other servers over the Internet (network 142).

The untrusted client 108 may also access services within the core network via the gateway 140. Because the untrusted client 108 is not a trusted device, the gateway 140 will not allow access to the core network 118 without proper authentication. Upon proper authentication, the untrusted client 108 may make use of different services depending on the location of those services within the core network services.

Some services include authentication, access to data services, access to voice services, access to charging services, regulatory compliance, etc.

Authentication

The untrusted client 108 may authenticate through the gateway 140 via an authorization server 152 within the core network 118 using a security protocol such as OAuth 2.0. The untrusted client 108 may provide a passcode, potentially a personal identification number, and/or other information provided as part of multi-factor authentication (MFA), in order to provide proper authentication. In such an authentication protocol, the user 104 would provide initial information via the untrusted client 108, which would then request access to the core network 118. A component of the core network 118, such as the authorization server 152, would correlate the initial information provided by the user 104 to locate a trusted device associated with the user 104, such as the cellular device 106.

The core network 118 can then provide a secondary identifier to the cellular device 106, from where the user 104 can enter the secondary identifier via the untrusted client 108. The trust accorded to the cellular device 106 is then imputed to the untrusted client 108.

Such multi-factor authentication protocols are known in the art, and any such known method may be used to authenticate the untrusted client 108. However, authentication does not resolve the problem that multiple users may have access to the untrusted client 108. For instance, if the user 104 authenticates the untrusted client 108 but then departs the vicinity of the untrusted client 108, and a different user enters the vicinity of the untrusted client 108, the untrusted client 108 may still be authenticated by the core network 118. Thus, the different user could access private information of the initial user 104 by way of the voice user interface 110 of the untrusted client 108. This issue is discussed in greater detail, below.

Access to Data Services

Upon authentication, the untrusted client 108 may access data services which are generally connected to the GGSN 136. For example, the untrusted client 108 can access an SMS (Short Messaging Service) and/or e-mail servers (not shown) via the GGSN 136 or directly. It is noted that all communication need not be asynchronous. For example, video calling is generally a data function, and the untrusted client 108 could access such a server directly. However, with the rise of LTE, IMS (IP Multimedia Subsystem), and VoIP (Voice over IP) networks, the distinction between historically voice and historically data services is being distorted and may soon be eliminated.

Access to Voice Services

Similarly, upon authentication, the untrusted client 108 may access voice services which are generally connected to the SGSN 124. For example, profile and billing information is generally accessible via the HLR 126 and PCRF 130, respectively, or their more recent analogues (for example, the HSS (Home Subscriber Server) has replaced the HLR 126 in 4G architecture). Voice mail historically was connected to the SGSN 124, but with the rise of data centric visual voice mail, some voice mail servers may be connected via the GGSN 136.

Access to Charging Services

In services that include payment, the untrusted client 108 may either make use of the cellular billing services 144, or may make electronic payment. In the former case, the untrusted client 108 may invoke a charge that is subsequently placed on the consumer's (user 104) cellular bill. For example, user 104 may start an international phone call, whereupon international calling charges are placed on the user's monthly cellular bill. In the latter case, a payment may be made via debit/credit card, gift card, prepaid card, or online account information.

Regulatory Compliance

Cellular services are regulated. Accordingly, all untrusted device 108 access to a cellular network, including the core network 118, must comply with relevant regulations. Regulations include, but are not limited to Emergency/911 (E-911), privacy of payment information, privacy of personal/identity data, and Communications Assistance for Law Enforcement Act (CALEA) interfacing.

The novel techniques presented herein are described in detail, below, with respect to several figures that identify elements and operations used in systems, devices, methods, computer-readable storage media, etc., that implement the techniques.

Figure 2:
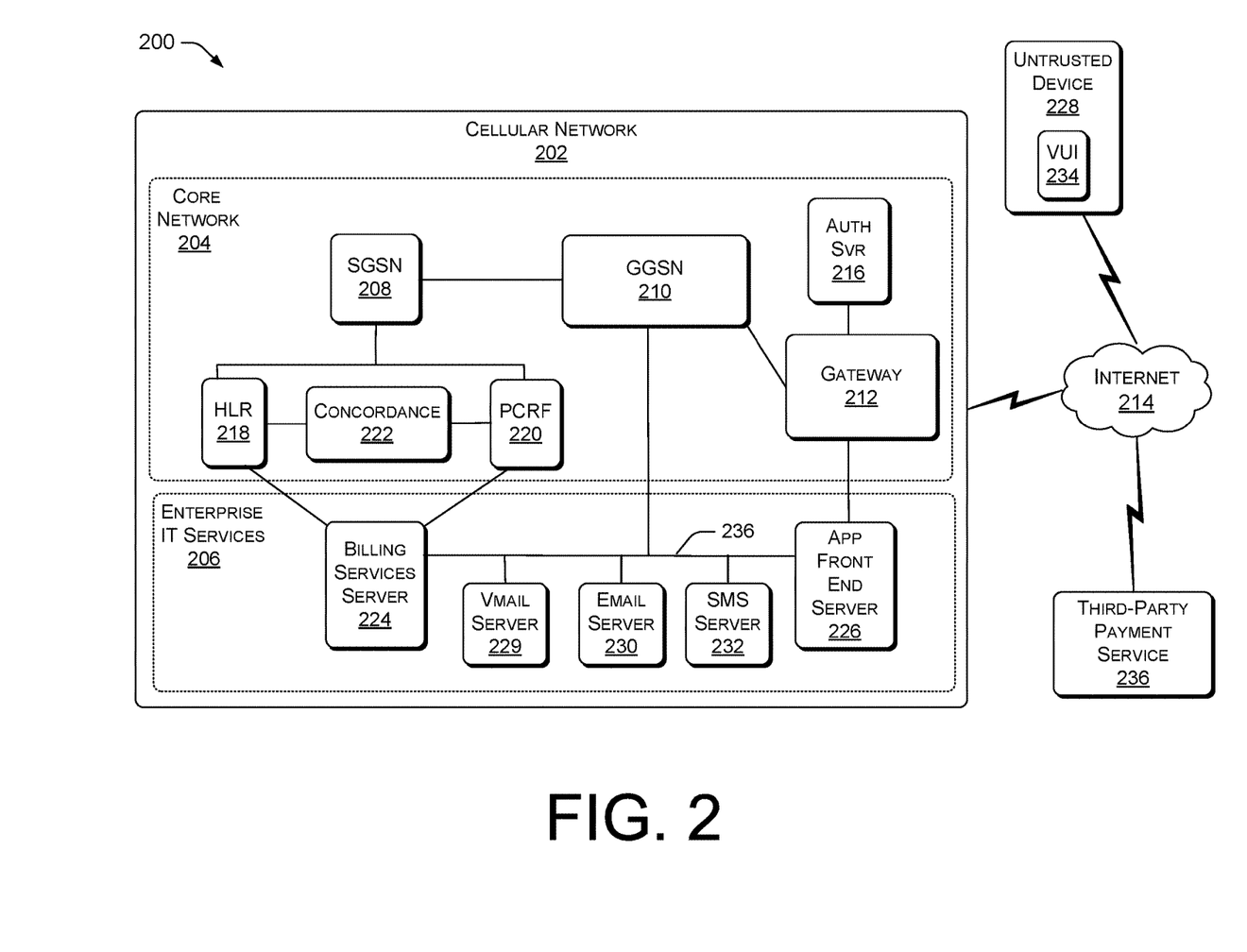
FIG. 2 is a diagram of an example network environment showing key features used to implement the technologies described herein.

FIG. 2 is a diagram of an example cellular network environment 200 showing key features used to implement the technologies described herein. In the following discussion, continuing reference may be made to the elements and reference numerals shown in and described with respect to FIG. 1.

The example cellular network environment 200 includes a cellular network 202. The cellular network 202 includes a core network 204 and Enterprise IT services 206. The cellular network 202 also includes other functional elements not shown in FIG. 2, such as the cellular tower 114 (FIG. 1) and base station 116 (FIG. 1) shown in FIG. 2, but only cellular network 202 elements necessary for the present discussion are shown in FIG. 2.

The core network 204 includes a SGSN 208 and a GGSN 210, which is connected to a gateway 212 that provides connectivity to the Internet 214. The core network 204 also includes an authentication server 216, but may also be configured to access external authentication servers (not shown) and processes. The core network 204 also includes an HLR 218, a PCRF 220, and a concordance 222, which correlates data between the HLR 218 and the PCRF 220. For instance, it is common for a single cellular account to be connected with multiple users and devices, such as in a family plan with a cellular service provider. The concordance 222, which can be a database or an application, can map a user phone number to an account associated with a different primary phone number, but which provides billing rights to the user phone number.

The EIT services 206 includes billing services 224, an application front end server 226, and several data services. In the example shown, the data services include a voicemail server 229, an e-mail server 230, and an SMS server 234. The application front end server 226 is optional, as the other components may be accessed directly by components of the core network 204 or by users via the gateway 212.

FIG. 2 also depicts an untrusted device 228 in communication with the Internet 214, and a third-party payment service 236 that is also connected to the Internet 214. The untrusted device 228 can be any untrusted electronic device capable of communicating with a network, but that does not include on-board identification means, such as a SIM card. For purposes of the present discussion, the untrusted device 228 includes a voice user interface (VUI) 234 and, at least in some cases, may not include any other type of user interface, such as a display screen or keyboard. The untrusted device 228 can be a digital assistant type of device, such as an Amazon® Echo® device, a Google Home® device, an Apple® Siri® device, or the like. The untrusted device 228 is virtually always on in a listening mode waiting for a user voice command via the VUI 234.

Authentication Infrastructure for Untrusted Devices

When the untrusted device 228 seeks to authenticate itself, it can make use of the OAuth 2.0 protocol, though other security protocols may be used. FIG. 2 illustrates modifications to OAuth 2.0 in order to accommodate an untrusted device. The untrusted device 228 can access the core network 204 via the gateway 212. The untrusted device 228 initially requests authorization from the gateway 212 to access a resource in the cellular network 202. A user of the untrusted device 228 may provide a passcode or other credential, which is then forwarded by the untrusted device 228 as part of the authorization request. The gateway 212 can then send the authorization request directly to the authentication server 216, or indirectly to the authentication server 216 via a proxy server (not shown).

The authentication server 216 can then validate the credentials proffered by the untrusted device 228. Part of the validation may include notifying the untrusted device 228 that the authentication server 216 is requesting an additional credential, such as a personal identification number (PIN). The user may then enter the credential via the untrusted device 228 for forwarding to the authentication server 216.

Alternatively, the user may then enter the additional credential via a device (not shown) that is trusted by the cellular network 202 and registered to the user. This scenario may commonly be performed as part of a multi-factor authentication (MFA) protocol. Because the user's device is trusted (e.g., by virtue of its SIM based identity), the trust accorded to the user's trusted device may accrue to the untrusted device 228, at least within the context of the session.

In this way, although the untrusted device 228 is not a trusted device, the above described techniques may authenticate requests sent over a specific session from the untrusted device 228. The authentication server 216 will then send an authentication token for the session to the untrusted device 228. The untrusted device 228 may then use the authentication token to obtain resources from a server 224, 226, 228, 230, 232 within the core network 202 in a secure and trusted fashion.

It is noted that in a cellular scenario, it is common for consumers to have multiple devices for a single account and to have multiple users for a single account. The concordance 222 assists in managing this complex cardinality of devices and users to a single account, by communicating with the HLR 218 or the PCRF 220, or both. Requests to authenticate a user may be accomplished by receiving those requests and forwarding identifying data to the concordance 222 to identify an account associated with a user of the untrusted device 228. The concordance 222 can be a database or an application that correlates entries in the HLR 218 to information in the PCRF 220. Such concordance schemes include T-Mobile ID® as implemented by T-Mobile US®.

Voice/Data Access Infrastructure for Untrusted Devices

Upon proper authentication, the untrusted device 228 may use a session token received in an authentication process to make requests of one or more resource servers within the core network 204. Such a resource request from the untrusted device 228 may route to the application front end server 226 that provides logic to respond to the request. In some cases, the request may correspond to an unmodified request to a server in the cellular network 202, such as a billing services server 224, a voice mail server 229, an e-mail server 230, an SMS server 232, or the like. For example, to send or read an SMS message, the application front end server 226 may simply forward the request to the SMS server 232 and then forward the SMS server 232 response with little or no modification. It is noted that the application front end server 226 and/or one or more of the data application resource servers (228, 230, 232) and/or the billing services server 224 may be either in the core network 204 or as standard enterprise servers. As described above, enterprise servers may be hosted in an information technology (IT) infrastructure and thereby function as an ordinary internet service endpoint. Example resource servers, as illustrated in FIG. 2, include but are not limited to the HLR 218, PCRF 220, billing services server 224, voicemail server 228, e-mail server 230, and SMS server 232.

However, the application front end server 226 may host an application that coordinates/orchestrates services via those resource servers 218, 220, 224, 228, 230, 232. For example, a request to receive a text with the balance of a bill may involve an invocation of the billing services server 224 and the SMS server 232. An application coordinating those two requests may reside in the application front end server.

Further note that the application front end server 226 may invoke and/or coordinate with services outside the core network. In such case, the application front end server 226 may access outside services hosted over the Internet 214 via the gateway 212. One example of an outside service that may be accessed is the third-party payment service 236, which is described in greater detail below.

Payment Infrastructure for Untrusted Devices

As described above, payment transactions may be conducted via the untrusted device 228 either by invoking the billing services server 224 within the cellular network 202, or by invoking the external third-party payment service 236. In the former, a payment from a user may be effected by adding a charge to the user's monthly cellular bill via the billing services server 224 within the cellular network 202. However, in this technique, payment is deferred until the user's cellular bill is paid. Furthermore, the cellular network 202 operator could then be responsible for collections in the event the user did not pay the cellular bill.

Alternatively, a user can register a credit card, debit card, gift card, prepaid card, or other payment method within the user's cellular account, such as by using a user/account identifier like T-Mobile ID®. When a request from the untrusted device 228 to make a payment is received by the application front end server 226, the correct payment method account is identified from the billing services server 224, and then transmitted to the application front end server 226. The application front end server 226 then interfaces to the third-party payment service 236 to the Internet 214 by way of the gateway 212. It is noted, however, that the gateway doesn't have to be the same gateway 212 through which the untrusted device 228 is accessing the core network 204, as it can be a different gateway (not shown). Since the gateway 214 will act as a go-between and/or proxy for securing the connection between the third-party payment services 236, a different gateway may be used where connection security is different than that of the gateway 212 for the untrusted device 228.

In at least one alternative implementation, the billing services server 224 may access the third-party payment service 236 without the intervention of the application front end server 226. Such a scenario is more likely when the payment information is already registered with the core network 204. For example, for Visa® and/or MasterCard® payments, the payment need only be cleared by forwarding the payment request with the cellular carrier's merchant identifier.

In other scenarios, such as with the use of PayPal®, the application front end server 226 makes a request to the third-party payment service 236 using an account registered with the billing services server 224 within enterprise IT services 206 or, alternatively, with a service (not shown) within the core network 204. As previously stated, different payment vendors have different security protocols and, accordingly, the application front end server 226 may access a different gateway than the gateway used by the untrusted device 228.

Regulatory Infrastructure for Untrusted Devices

The cellular industry is a highly regulated industry, with some regulations being specific to operational requirements of a cellular network. Examples of such regulations are E-911 and CALEA (Communications Assistance for Law Enforcement Act), which require cellular devices to maintain connectivity with emergency responder services. Other regulations are specific to the management of data, which apply to non-cellular technologies as well as to cellular operations. One example of such regulation regards user privacy and protection of user data, about which there are numerous federal and state laws and regulations.

Regarding emergency responder services, regulations may prescribe that the untrusted device 228 to indicate a location of the device 228 and/or a user of the device 228. For untrusted devices that are enabled for Wi-Fi, the untrusted device 228 may obtain location based on the location of an associated Wi-Fi device. In at least one other implementation, the untrusted device 228 may request a default location that can be specified by a user in a setup routine or by command. In this way, in the event the user makes a 911 emergency call, the untrusted device 228 may provide at least one option of notifying E-911 authorities of the user's location.

The untrusted device 228 location may be determined as part of, or in concert with, location services provided by the consumer's user equipment as well. When an untrusted device is connected to the cellular network 202, and a user thereof initiates an emergency call to 9-1-1 or some other responder, the cellular network can utilize one or more of the HLR 218, the PCRF 220, and/or the concordance 222 to identify a trusted cellular device associated with the user of the untrusted device. Cellular location services can then be used to locate the user's trusted cellular device, and the location of the trusted cellular device may be imputed to the untrusted device 228.

The Communications Assistance for Law Enforcement Act (CALEA) is a law that provides the basis for regulations of allowing law enforcement authorities to wiretap communications under a proper showing of cause and/or obtaining a warrant from a competent jurisdiction. Cellular carriers provide entry points to enable CALEA interfacing for communications for both cellular user equipment and for Wi-Fi calling. Specifically, where a communications channel and/or session is identified for legal wiretap, including for a call initiated by an untrusted device, the channel and/or session is subjected to the usual CALEA interface points. For an untrusted device, identification may be made by way of the gateway 212, the authentication server 216, the application front end server 226, a proxy server (not shown), or other point in the cellular network 202.

In the case of identification via the gateway 212 or the proxy, channel/session identification is done via an initial request for authentication. The gateway 212 or the proxy (not shown) is configured with a notification list that indicates a redirection path for any communications from a particular user account or user identifier. Upon receiving a request containing that particular user account or user identifier, the gateway 212 or the proxy (not shown) may set up a recording or forwarding of a communications stream for that session prior to forwarding data to the authentication server 216 and/or application front end server 226.

Similarly, the authentication server 216 may look for user account or user identifiers on a notification list. Here, recording or forwarding of a corresponding communications stream of the session is initiated only after a user's identity has been verified. In this way, failed sessions are not recorded.

The application front end server 226 may also have access to a notification list comprised of user accounts and/or user identifiers marked for CALEA wiretapping. Upon detecting a session using one such user account or user identifier, the application front end server 226 may redirect the session for recording and/or monitoring prior to forwarding the requests to the appropriate resource server. In this way, communications may be filtered only for voice communications, or for resource requests involving communications.

Privacy regulation applies to cellular communications for user identity information, sensitive user data, and for user payment information. Some information is to be kept encrypted. Other information is prohibited from being forwarded or otherwise exposed. Because the application front end server 226 acts as a clearinghouse for requests, the application front end server 226 may be configured to have data interfaces 236 with the various resource services. Each data interface 236 may have access control privileges associated on a per-data-field and/or a per-function basis. For data prohibited from being exposed, a data interface 236 will simply not have a corresponding value or application programming interface (API). For data limited from being exposed, the API may enforce encryption, or enforce rules when private data may be exposed.

Example Methodological Implementation—Session Authorization

Figure 3:
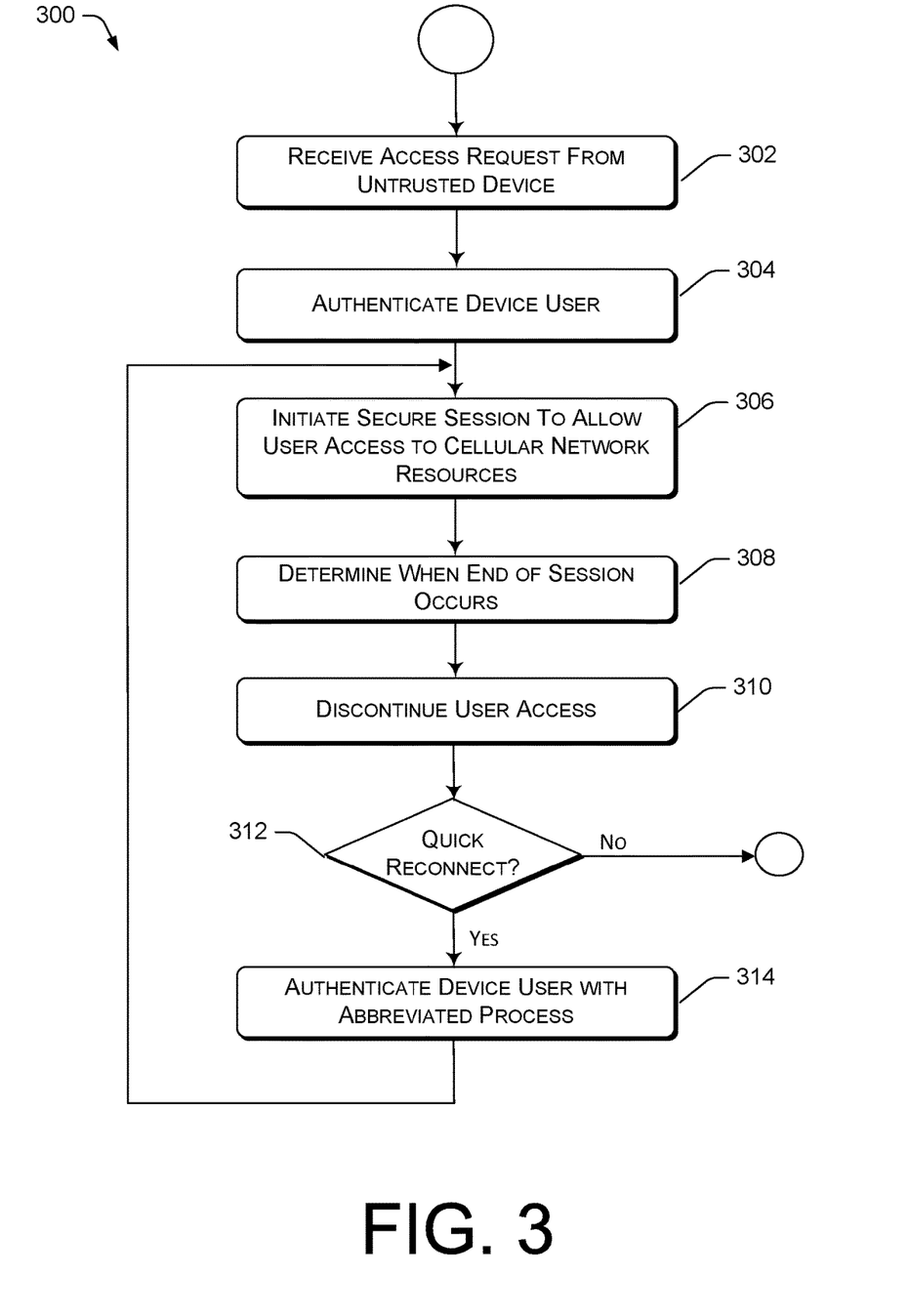
FIG. 3 is a flow diagram of an example methodological implementation for untrusted device access to services over a cellular network.

FIG. 3 is a flow diagram 300 that depicts a methodological implementation of at least one aspect of the techniques for untrusted device access to services over a cellular network described herein. In the following discussion of FIG. 3, continuing reference is made to the elements and reference numerals shown in and described with respect to FIG. 2. In the following discussion related to FIG. 3, certain operations may be ascribed to particular system elements shown in FIG. 2. However, alternative implementations may execute certain operations in conjunction with or wholly within a different element in the system.

At block 302, the gateway 212 receives a request from the untrusted device 228 whereby the untrusted device 228 seeks access to one or more resources in the cellular network 202. The request can be initiated in one of several ways. Since the untrusted device 228 has a voice UI 234, the request could be a verbal command such as, "Pay my cell phone bill." Such a verbal command would be processed by the client service provider 150 (FIG. 1), from previously understood details regarding the user 104 (FIG. 1) of the untrusted device 228. Such previous knowledge would need to be known by the client service provider 150, and would likely be associated with an owner of the untrusted device 228, and not necessarily the user 104. Because of the hazards posed by such an arrangement (e.g., a non-owner user accessing private information of the device owner), gathering additional secret information from the device owner would be necessary.

Other types of commands and other methodologies can be used whereby user-identifying information is provided in the initial request. In at least one implementation, a user provides a first user identifier in the initial request. As previously discussed, the first user identifier can be one of many forms, such as a telephone or account number, a user name, a network-assigned identification character string, etc.

If the first user identifier is not received in the initial request for access to cellular network 202 services, the gateway 212 will request this information from the user. After block 302 is executed, the gateway 212 will have sufficient information to identify a purported user listed in the HLR 218 or linked to an account identified in the HLR 218 and/or the PCRF 220.

At block 304, the core network 204 authenticates the untrusted device and/or the user of the untrusted device 228. In the authentication process, the gateway 212 can communicate with the authentication server 216 (or an external authentication service (not shown)) to carry out any authentication protocol that sufficiently protects the cellular network 202 from access by individuals that should not have access to the network. As discussed above, the Auth 0 2.0 protocol is one protocol that may be executed by elements of the core network 204.

In one or more implementations of the authentication operation, the gateway 212 may request additional identifying information from the untrusted device 228 (i.e., the gateway 212 may implement multi-factor authentication). In such a process, a query is made to a user of the untrusted device 228 to provide a second identifier in conjunction with the first identifier already provided. The second identifier is typically a secret previously provided by the user to the cellular network 202. When the user provides a second identifier that matches the secret, the user may be authenticated and authorized to access resources in the cellular network.

In at least one other implementation, the gateway 212 uses the first identifier provided by the user to identify a trusted device associated with the user. This is done by a lookup procedure in the HLR 218, the PCRF 220, the concordance 222, or a combination thereof. For example, the user may provide a value that uniquely identifies the user within the cellular network 202. That value may then be used to look up the telephone number of a cell phone belonging to the user. The second identifier may then be provided via the cell phone, which the user confirms by providing the second identifier to the gateway 212 via the untrusted device 228. Upon providing a matching second identifier, the user and device are allowed access to the cellular network 202.

After authentication is complete, at block 306, a secure session is initiated between the untrusted device 228 and the requested resource in the cellular network 202 via the gateway 212. Typically, this is accomplished by passing an authentication token to the untrusted device 228. In subsequent communications, the untrusted device 228 provides the authentication token to the cellular network 202, which causes the gateway 212 to allow the untrusted device 228 access to a resource in the cellular network 202. Typically, such an authentication token will expire at a specified time.

Other methods not specifically using a token may be used without departing from the scope of the techniques described herein. For example, after authentication is made, the gateway 212 may allow communication between the untrusted device 228 and a resource in the cellular network for a certain period of time, or until certain conditions are met.

At block 308, the gateway 212 or some other component in the cellular network 202 determines that the session between the untrusted device 228 and the cellular network 202 has expired, after which the untrusted device 228 access to the cellular network 202 is discontinued.

Determining when the session should be terminated presents additional issues when the untrusted device 228 is one with which a user has interacted with via a voice user interface 234. Other issues are present when the voice user interface 234 is the only user interface on the untrusted device. This is because digital assistant devices, such as Echo®, are designed to allow multiple users access external resources via the devices. This means that when a user provides credentials to access a secure resource, there is a danger of the access continuing after the user has left the vicinity of the untrusted device 228, and another person may continue to access the secure resource and gain access to private data of the original user. Therefore, precautions should be made in such a situation even though such precautions may place some efficiency limitations on transactions with the untrusted device 228.

To determine when an authenticated session should be terminated, the gateway 212, or some other component of the cellular network 202, may receive an "end session" command from the untrusted device 228. Such a command may be issued in response to a verbal command from the user to end the session, or it may be in response to a determination made at the untrusted device 228 or at the client service provider 150 (FIG. 1), such as speech recognition software determining that a different person has issued a verbal command.

A determination may also be made that the session has ended when a different user begins to use the untrusted device 228. This can be determined by an initial user logging out of the system, by a subsequent user submitting an access request under different credentials, or some other condition coming to pass.

In at least one other implementation, a determination may be made that the session has ended when a transaction conducted with a cellular network resource by the user is concluded. This can be a single transaction, or it may be a set of operations that comprise what is considered to be a single transaction, such as a bill payment transaction.

Making allowances for multiple user access, as described above, can degrade the user experience with the untrusted device 228 and the cellular network 202. This is due to the fact that an access session may be cut off before a user completes multiple transactions due to connection or authentication protocols, such as limiting access to a single transaction. In such a case, the user would be required to request authentication again, so as to execute a subsequent transaction. Requirements for multiple log-ins can reduce user efficiency in interactions with the cellular network 202.

One way that such an inefficiency can be mitigated is to provide an abbreviated user authentication after an authenticated session ends. Such an abbreviated authentication process may be available for a limited time after a session has expired. In an implementation that uses a two-stage authentication process to allow the user to initially access the cellular network 202, a subsequent abbreviated logon may be used whereby the user only is required to perform a second part of an authentication password.

For example, in a scenario in which a user requests access and provides a first user identifier, the authentication server 216 may require the user to provide a second user identifier. After an initial session has ended, the user may wish to continue access to the cellular network 202. If so, then an abbreviated authentication process may only require the user to provide the second user identifier to begin a subsequent session. In other words, the cellular network 202 will remember and associate the first user identifier with the untrusted device 228 for a limited period of time after the original session has ended. In this way, even though the user must re-authenticate, the authentication process is somewhat less burdensome.

It is noted that, although the untrusted device 228 is a digital assistant type of device that exclusively uses a voice UI as its only interface, the techniques described herein can relate to any untrusted device attempting to access secured resources. However, different techniques can be implemented if the untrusted device 228 is a different type of device. For example, the untrusted device 228 may comprise a tablet computer, such as an iPad® or something similar. Such devices typically have alternative user interfaces, such as a soft keyboard, a voice UI, an optical UI, etc. Such a device is typically able to provide multiple identifiers (i.e., a user id and a password) to the gateway 212 in an initial request for access to the cellular network 202. Such a scheme is not necessarily desirable with a device only having a voice UI. It is noted that certain session limitations described below may be more efficient when used with a voice-UI-only type of device than when used with a device having one or more other types of user interface, or with a device that is not typically used by multiple users in a short amount of time.

In the event that the cellular network 202 is able to identify the type of device making a request for access to network resources, different access protocols may be implemented. For instance, a session may be configured to last for a longer period of time if a voice-user-interface-only device is used. Furthermore, authentication protocols may be different for a voice-user-interface-only device than for a tablet, a personal computer, or other type of device assumed to have more limitations on multiple user access.

Example Methodological Implementation—Payment to Cellular Provider

Figure 4:
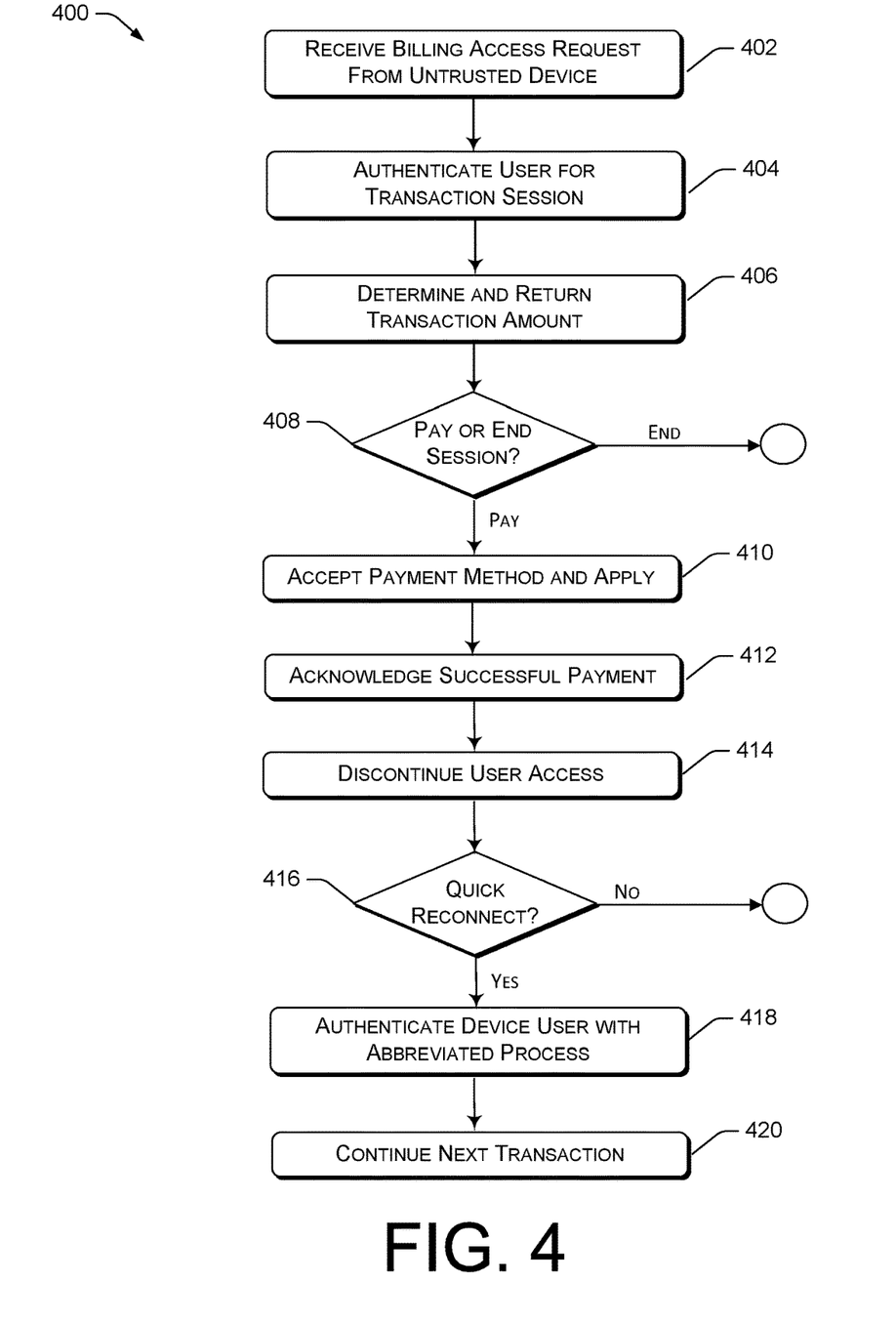
FIG. 4 is a flow diagram of an example methodological implementation for untrusted device access to services over a cellular network.

FIG. 4 is a flow diagram 400 that depicts a methodological implementation of at least one aspect of the techniques for untrusted device access to services over a cellular network described herein. In the following discussion of FIG. 4, continuing reference is made to the elements and reference numerals shown in and described with respect to FIG. 1 and FIG. 2. In the following discussion related to FIG. 4, certain operations may be ascribed to particular system elements shown in FIG. 1 and/or FIG. 2. However, alternative implementations may execute certain operations in conjunction with or wholly within a different element in the system.

As discussed thoroughly herein, an untrusted device may provide an alternative user interface to any service offered by a cellular provider. Cellular providers, at their core, provide access to cellular infrastructure and communication services. In addition, cellular providers provide a wide range of support services ancillary to the provision of the core services. Such ancillary services include buying and selling cellular telephones, facilitating changes to cellular billing plans, customer care, information services, etc.

At block 402, the gateway 212 receives a request to access the billing services server 224 in the cellular network 202. A user paying her cellular bill is a typical operation that occurs in the context of a cellular network many times each day. There are many other interactions between a user and the billing services server 224, but the discussion of FIG. 4 will focus on a process for a user to pay a cellular bill associated with the user. It is noted that the gateway 212 may interact with the application front end server 226 of the EIT services 206 to access the billing services server 224.

In such a context, the user must be authenticated prior to being allowed access to the billing services server 224 to pay her bill. At block 604, the gateway 212 operates in conjunction with the authentication server 216 to request, receive, and verify certain information from the untrusted device 228 (i.e., a user). In at least one implementation, the user provides a first identifier that the cellular network 202 has associated with the user. Such a first identifier may be proprietary to the cellular network 202 or may be an arbitrary user identifier. Upon receipt of the first identifier, the authentication module 216 references a core network resource, such as the HLR 218, the PCRF 220, and/or the concordance 222 to verify that there is a cellular network customer associated with the first identifier.

A second identifier is identified that is associated with the user and the first identifier. The gateway 212 transmits a request to the untrusted device 228 to verify the second identifier, which the user subsequently does through the untrusted device 228. The gateway 212 and/or the authentication server 216 thereafter attempt to verify that the response received from the untrusted device 228 matches the second identifier from the HLR 218, PCRF 220, and/or concordance 222.

Other authentication methods exist whereby the second identifier may be verified by sending a text string to the user by way of a cellular device associated with the user. The user may then return the text string (i.e., the second identifier) by way of the untrusted device 228 to authenticate to the cellular network 202. Any method of authenticating the user and/or untrusted device 228 may be used with the techniques described herein.

When the cellular network 202 has authenticated the untrusted device 288 and user, the application front end server 226 determines the requested information from the billing services server 224 and the value is returned through the gateway 212 to the untrusted device 228 (block 406). At block 408, the user has an option of ending the session (e.g., if the user merely wanted to know her balance), or making a payment on the balance.

If the user wants to end the session ("No" branch, block 408), then the session ends. If the user wants to make a payment on the balance ("Yes" branch, block 408), then the user provides payment information to the gateway 212. In the event that a debit card or a credit card on file is specified for payment, the user may be queried to provide a validation value, such as a card security code (CVV, CSC, CVD, CC2, 4DBC, CID, etc.).

Upon the user providing a card security code via the untrusted device 228, the application front end server 226 invokes the billing services server 224 to initiate payment with the designated card (block 410). At block 412, the application front end server 226 transmits an acknowledgement to the untrusted device 228, after which the session is discontinued (block 412).

As previously discussed, there are different implementations that vary as to when a session should end. In this case, the session ends after a payment transaction has completed. In other implementations, the session may continue until the user issues a command to end the session. In the presently described implemented, the session ends upon completion of the payment transaction. However, at block 416, the user may wish to reconnect and continue a session with the cellular network 202. In one implementation, the option is available to the user for a certain time period after the initial session has ended. If the user does not communicate a desire to continue the session, no further action is taken ("No" branch, block 416).

However, if the user wishes to continue a session with the cellular network 202 ("Yes" branch, block 416), then the user can indicate that desire by issuing a verbal command via the VUI 234. The untrusted device 228 and/or user is re-authenticated at block 418. Because a full authentication process may be too inefficient or burdensome for the user, an abbreviated authentication process may be used after an initial secure session has ended. In at least one implementation involving multi-part authentication, this may only require the user to communicate a second identifier to the gateway 212. In other words, for a limited time after a session has ended, the gateway 212 will associate the untrusted device 228 with the user's account. However, the user may still be required to validate a passcode or other type of second identifier to access the cellular network 202.

Once the abbreviated authentication process has successfully completed, the user continues with a subsequent transaction at block 420.

In addition to making an inquiry regarding the user's account, the untrusted device 228 may be used for other types of payment transactions with the cellular network 202. The untrusted device may be used with a cellular provider's online store to purchase phones or other equipment, to sign up a new subscription plan, to alter an existing subscription plan, etc. Such processes may include many non-payment steps, but ultimately conclude with a payment, which may cause the user session to conclude.

For example, a user may desire to schedule a trade-in of their cellular phone as part of an upgrade. Using the untrusted device 228, a user may specify a desired smartphone upgrade, a physical store, and a time to schedule an appointment to exchange the old smartphone for a new smartphone. As an alternative example, a user may change a data plan, add a subscriber to a family plan, or otherwise make changes that conclude with a payment as described above. In at least one implementation, multiple transactions involved in a process may be completed within a session, with the session concluding when a payment is made.

Access to Cellular-Specific Services

Figure 5:
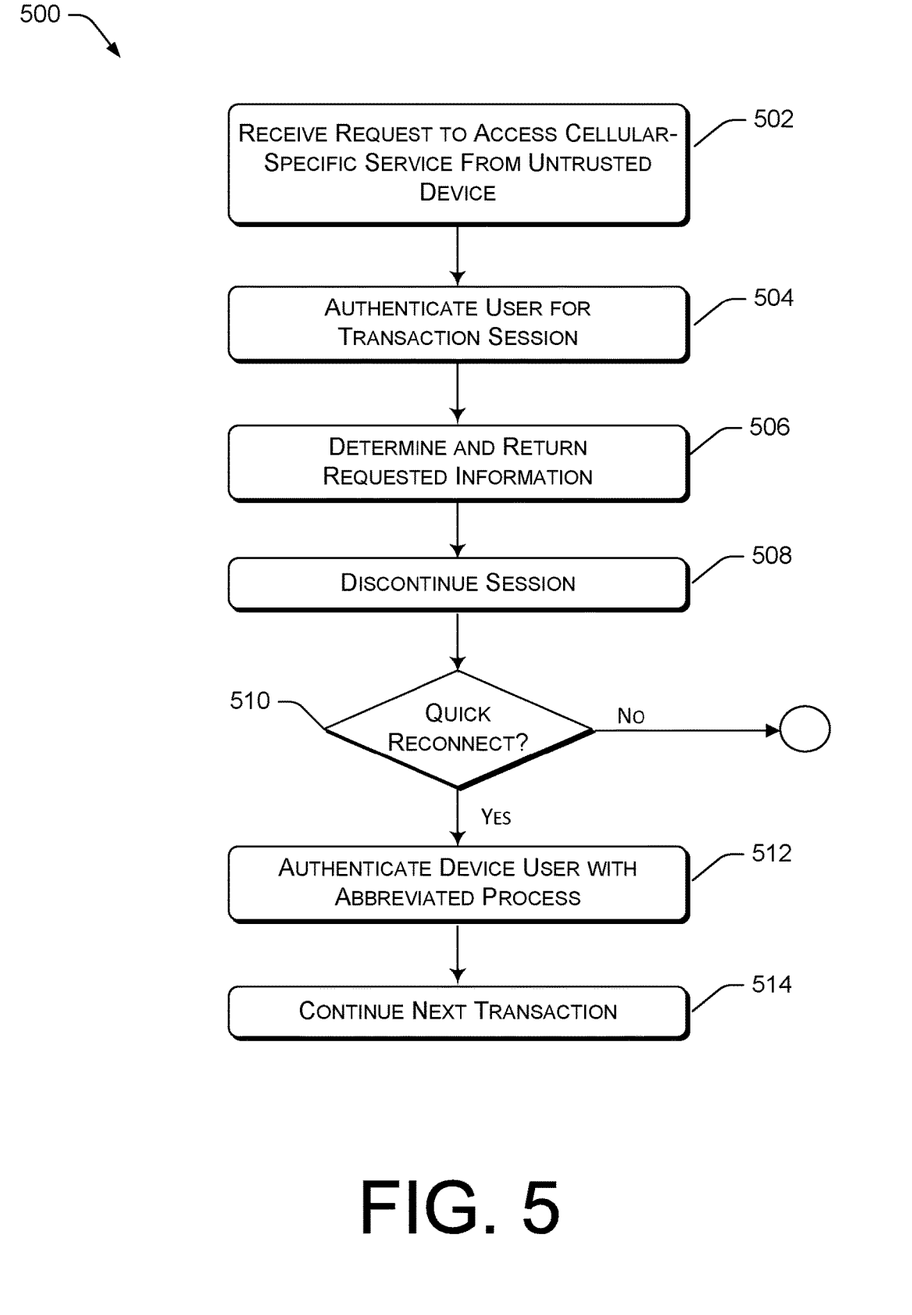
FIG. 5 is a flow diagram of an example methodological implementation for untrusted device access to services over a cellular network.

FIG. 5 is a flow diagram 500 that depicts a methodological implementation of at least one aspect of the techniques for untrusted device access to services over a cellular network described herein. In the following discussion of FIG. 5, continuing reference is made to the elements and reference numerals shown in and described with respect to FIG. 1 and FIG. 2. In the following discussion related to FIG. 5, certain operations may be ascribed to particular system elements shown in FIG. 1 and/or FIG. 2. However, alternative implementations may execute certain operations in conjunction with or wholly within a different element in the system.

Generally, the untrusted device 228 can access cellular-specific services that do not involve a payment transaction. A cellular-specific service is a service that is hosted within the cellular network 202, including but not limited to the core network 204 and/or enterprise IT services 204. Accordingly, cellular-specific servers are trusted within the cellular provider's infrastructure. Non-limiting examples of such servers are the voice mail server 229, the e-mail server 230, and the SMS server 232.

At block 502, a user requests access to a cellular network 202 from the untrusted device 228. As part of the request, the user may specify a particular service, such as initiating an SMS session, initiating an e-mail, initiating a phone call, accessing voice mail, etc. At block 504, the untrusted device 229 and the user are authenticated as previously described.

Upon receiving the request for the service from the untrusted device, the application front end server 226 invokes an appropriate resource server (229, 230, 232) for the requested service. The requested information is determined and returned to the user via the untrusted device 228 (block 506). Since the transaction began with a request for information, once the information is returned, the transaction may be deemed to be complete and, hence, the session terminated at block 508. However, in at least one other implementation, the session need not be terminated at this point, and some other method of determining when the session should end is made.

For a limited time after the session is disconnected, the user may be offered an option to continue with a subsequent session. If the user does not want to continue ("No" branch, block 510), then no further transactions are made. If the user does indicate a desire to continue ("Yes" branch, block 512), then the abbreviated authentication process described above, or some other abbreviated authentication process, is conducted at block 512. Thereafter, the user may continue with a subsequent transaction with the cellular network 202 (block 514).

Access to Non-Cellular-Specific Services

Figure 6:
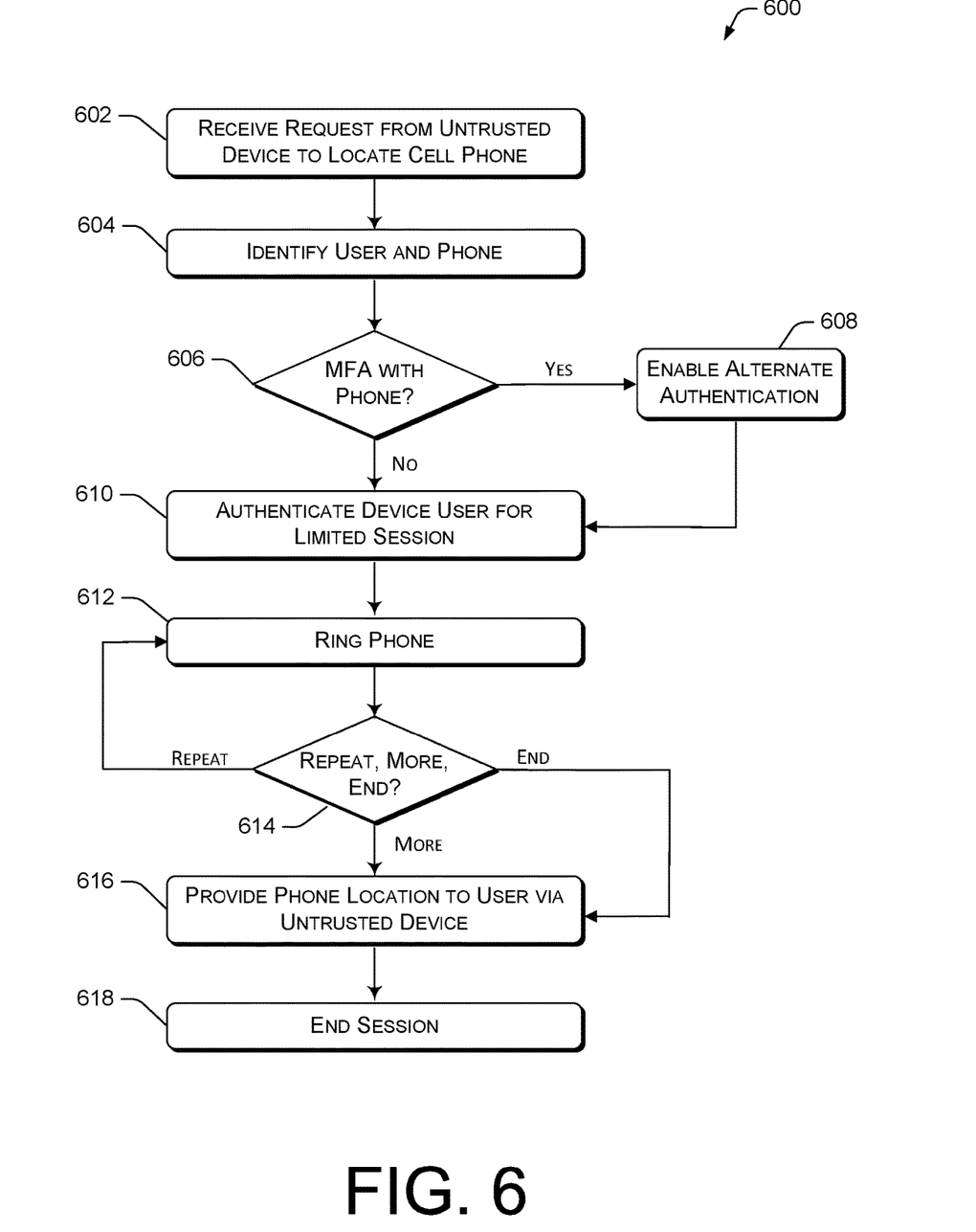
FIG. 6 is a flow diagram of an example methodological implementation for untrusted device access to services over a cellular network.

FIG. 6 is a flow diagram 600 that depicts a methodological implementation of at least one aspect of the techniques for untrusted device access to services over a cellular network described herein. In the following discussion of FIG. 6, continuing reference is made to the elements and reference numerals shown in and described with respect to FIG. 1 and FIG. 2. In the following discussion related to FIG. 6, certain operations may be ascribed to particular system elements shown in FIG. 1 and/or FIG. 2. However, alternative implementations may execute certain operations in conjunction with or wholly within a different element in the system.

The application front end server 226 is not limited to integrating services that are within the cellular network 202. The application front end server 226 may also integrate services that are located outside the cellular network 202. The following discussion will describe two example scenarios in which the untrusted device 228 obtains access to the cellular network 202 and is thereafter connected by way of the application front end server 226 to at least one remote server. The first example relates to a "find my phone" feature. The second example relates to promotional services offered by third parties in conjunction with the operator of the cellular network 202.

"Find My Phone"

Cellular consumers are familiar with variants of a feature commonly referred to as "find my phone." Frequently, a cell phone user temporarily misplaces his phone and requires assistance to locate it. Usually, a user can do this on his own by calling his cell phone number and listening for the cell phone ring tone. However, this method does not always work. If the phone is located a distance that is out of hearing range for the user, he cannot rely on finding the phone by listening for its ring tone. Or, if the phone is turned off, out of battery power, on vibrate alert mode, etc., the user cannot activate the ring tone.

Cell phone manufacturers and cellular service providers sometimes offer a "find my phone" feature that allows the user to utilize the location services of a cellular provider network to visually indicate a location of the cell phone. This is helpful when, for instance, a user leaves his cell phone in a restaurant and cannot hear the phone ring. In such a case, the user can log onto an Internet site provided by the cell phone manufacturer or the cellular network provider and see a map that will indicate that the cell phone is situated where the restaurant is located. Such a visual indicator is typically in the form of a street map.

Unique problems can arise when a user accesses a cellular network "find my phone" feature from an untrusted device, such as the untrusted device 228 shown in FIG. 2. For one, the untrusted device 228 does not have a visual display on which a cell phone location can be shown. For another, if system access includes multi-factor authentication that provides a second identifier via the user's cell phone, that authentication scheme cannot be used when the user is not in possession of his phone. These issues are discussed below, with reference to the flow diagram 600.

At block 602, the gateway 212 receives a "find my phone" request from the untrusted device 228. The gateway 212 routes the request to a component in the cellular network 202 that is configured to activate location services to find a location of a cell phone belonging to a user making the request (block 604). This can be done by getting a first identifier from the user, such as an id from the cellular network 202 operator, a user name, a phone number, etc. The first identifier can be referenced in the HLR 218, PCRF 220, and/or concordance to identify a cell phone and cell phone number associated therewith.

At block 606, a determination is made as to whether a second identifier is normally required in the authentication process. In other words, is the standard authentication process a multi-factor authentication scheme? If it is ("Yes" branch, block 606), then an alternate authentication method is enabled at block 608. This method can be simply not requiring the second stage of the MFA, since a malicious user wouldn't be able to access private data in this transaction. Or it could be to simply require a second identifier from the user via the voice user interface 234 of the untrusted device 228. If there is not a MFA scheme in place ("No" branch, block 606), then no change is needs to be made to the default authentication method.

At block 610, the untrusted device 228 and user are authenticated for the limited session. The limited session does not allow access to private data in the cellular network 202, and only operations that are necessary to locating the cell phone, activating the cell phone, and providing location information to the user via the untrusted device 228 are allowed.

At block 612, a ring command is issued from the cellular network 202 to the lost cell phone. If the cell phone ringer is not activated, or if the volume is turned down, one or more commands from the cellular network 202 (i.e., the application front end server 226) may also be issued to place the cell phone in a state wherein the cell phone ring tone can be detected by someone in close proximity to it. In addition to, or in lieu of, activating the cell phone ring tone, the application front end server 226 may send a class 0 SMS (also known as a Flash SMS) to the cell phone, to cause the cell phone display to light up so as to be easier to detect the cell phone location.

After the ring tone has sounded (and/or the display has flashed) for a specified amount of time or a specified number of times, the user is provided an option at block 614 to repeat the same action (ring or flash display activation), to receive location information, or to end the session. If the user does not respond within a certain amount of time, or if the user indicates a desire to end the session ("End" branch, block 614), then the cellular network 202 ends the session (block 618). If the user wants to continue the present action ("Repeat" branch, block 614), then the process executes block 612 again and rings and/or flashes the cell phone.

If the user indicates a desire to receive more information ("More" branch, block 614), then a location description corresponding to the location of the cell phone is provided to the user via the VUI 234 of the untrusted device 228 (block 616). Because the untrusted device 228 does not have a display, a map cannot be provided for this purpose. Therefore, some other way must be used to communicate the cell phone location or vicinity to the user. In at least one implementation, a physical address of an address grid system that overlays the cell phone may be provided to the user. In one or more other implementations, a relative location may be provided to the user, e.g., "Your cell phone is located two hundred feet northwest of your current location." The "current location" would be the location of the untrusted device 228. In yet other implementations, geographical coordinates of the cell phone location may be provided to the user. Other techniques for identifying the location of the cell phone may be used.

After the location description is transmitted to the user, the session is ended at block 618. If the user desires to continue access to the cellular network 202 at this point, a request can be made to that end. Thereupon, the authentication process reverts to the default authentication process, which may be a MFA scheme.

Joint Promotions

At times, a cellular provider may enter into a promotion agreement with one or more partner companies whereby customers of the cellular provider may take advantage of special offers and/or discounts for goods and/or services offered by the partner companies. Although such promotions may be provided based on a location of a customer (e.g., when a customer enters a partner company place of business), some promotions may be available to a relatively fixed location device, such as the untrusted device 228. With such a device, the promotions may be viewed as something akin to a coupon that customers redeem for goods or services or discounts thereon.

In at least one implementation, the customer is made aware of an offer by, for instance, a television commercial, and makes a request via the VUI 234 of the untrusted device 228 to access the offer. The gateway 212 and the authentication server 216 handle authentication of the untrusted device 228 and user as described above. The application front end server 226 determines that a customer request is being made about a current promotional offer and may provide details to the untrusted device 228 about the offer.

In at least one implementation, the application front end server 226 initiates fulfillment of the request, in which case, the application front end server 226 may make a request to a server outside of the cellular network 202. For example, if the offer is for a free pizza from Zed's Italian Kitchen, the application front end server 226 will contact a server hosting a service for Zed's Italian Kitchen and connect the untrusted device 228 thereto. The customer can then place an order from Zed's, a charge for which is made according to terms of the offer.

In some cases, an arrangement may be made for the cellular provider to pay the partner company for all or a portion of the goods and/or services the partner company provides to the customer pursuant to the offer. In such a case, the application front end server 226 can be configured to provide a payment to the partner company. In other cases, a term of the offer may be that the customer's monetary responsibility will be logged to the customer's user account. In such a case, the application front end server 226 can initiate a payment to the partner company, and debit the customer's cellular account for the same or a discounted amount.

Example Computing Device

Figure 7:
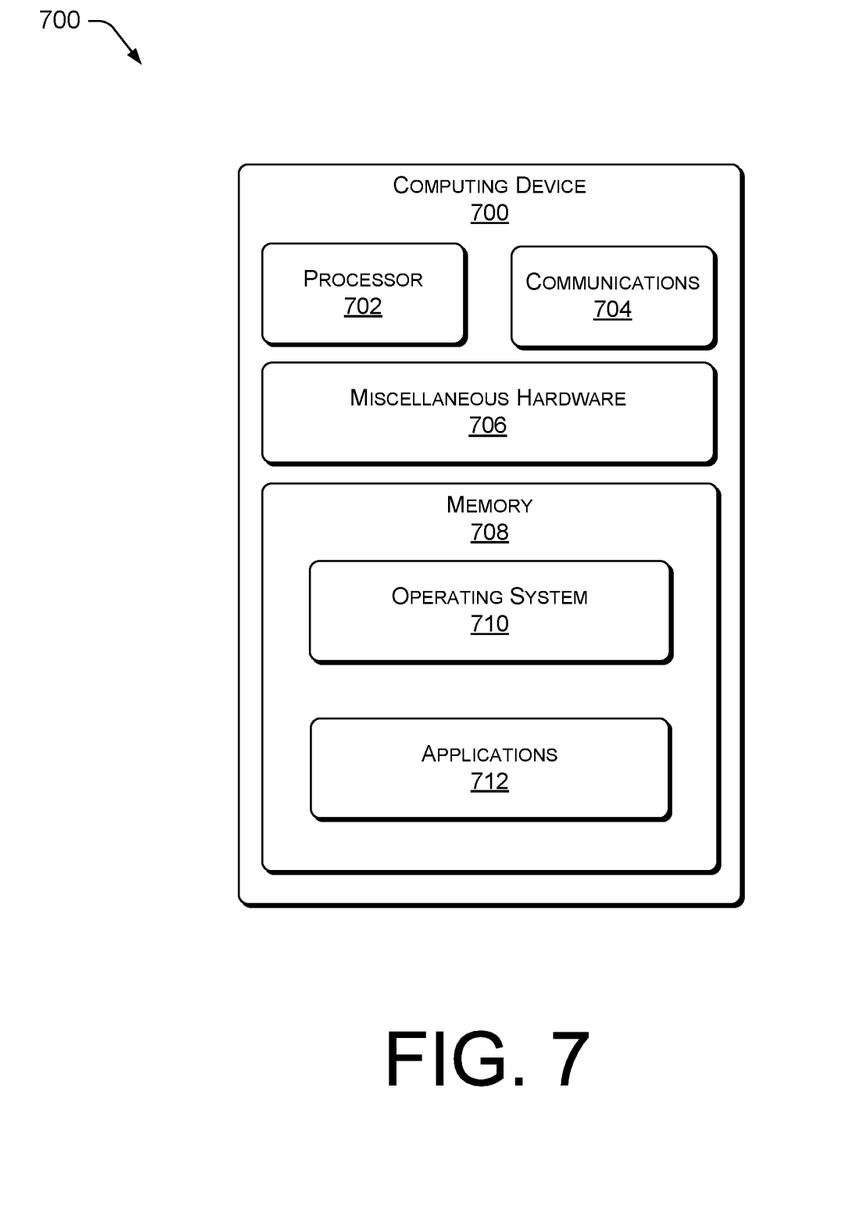
FIG. 7 is a block diagram of an example computing device constructed in accordance with at least implementation of the techniques described herein.

FIG. 7 represents an example computing device 700 constructed in accordance with at least implementation of the techniques described herein. The present description includes reference to multiple computing devices, specifically servers (see FIG. 2) and the untrusted device 228 of FIG. 2. The example computing device 700 depicts components that are implemented in such devices.

The example computing device 700 is any processor-based device having the capability to perform the operations described herein, such as a server, a personal computer, a cellular telephone, an electronic tablet, a handheld computing device, and the like. The example computing device 700 includes a processor 702 that includes electronic circuitry that executes instruction code segments by performing basic arithmetic, logical, control, memory, and input/output (I/O) operations specified by the instruction code. The processor 702 can be a product that is commercially available through companies such as Intel® or AMD®, or it can be one that is customized to work with and control and particular system.

The example computing device 700 also includes a communications interface 704 and miscellaneous hardware 706. The communication interface 704 facilitates communication with components located outside the example computing device 700, and provides networking capabilities for the example computing device 700. For example, the example computing device 700, by way of the communications interface 704, may exchange data with other electronic devices (e.g., laptops, computers, other servers, etc.) via one or more networks, such as the Internet 214 (FIG. 2) or the network 142 (FIG. 1). Communications between the example computing device 700 and other electronic devices may utilize any sort of communication protocol for sending and receiving data and/or voice communications.

The miscellaneous hardware 706 includes hardware components and associated software and/or or firmware used to carry out device operations. Included in the miscellaneous hardware 706, but not specifically shown, are one or more user interface hardware components—such as a keyboard, a mouse, a display, a microphone, a camera, and/or the like—that support user interaction with the example computing device 700. It is noted that the untrusted device (228, FIG. 2) may only include a voice user interface in one or more implementations. In such a case, user interface components of the untrusted device 228 would only include a microphone and a speaker. However, some implementations of the untrusted device 228 may include additional user interface components as well.

The example computing device 700 also includes memory 708 that stores data, executable instructions, modules, components, data structures, etc. The memory 708 may be implemented using computer readable media, such as computer storage media. Computer-readable media includes at least two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism.

An operating system 710 is stored in the memory 708. The operating system 710 includes components that enable the example computing device 700 to receive and transmit data via various inputs (e.g., user controls, network interfaces, and/or memory devices), as well as process data using the processor 702 to generate output. The operating system 710 can include a presentation component that presents the output (e.g., display the data on an electronic display, store the data in memory, transmit the data to another electronic device, etc.). Additionally, the operating system 710 can include other components that perform various additional functions generally associated with a computer operating system. The memory 710 also stores various software applications 712, or programs, that can support electronic device functionality or provide a general or specialized device user function that may or may not be related to the electronic device per se.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   receiving, via a voice user interface of an untrusted device, a verbal command to access a secure service associated with a cellular network, the untrusted device being unaffiliated with the cellular network;
   receiving, via the voice user interface of the untrusted device, an audible authentication credential that is associated with the cellular network;
   authenticating a user identity that is associated with the cellular network, based at least in part on the audible authentication credential;
   transmitting an authentication token to the untrusted device to access the secure service associated with the cellular network, based at least in part on the verbal command and authenticating the audible authentication credential that is associated with the cellular network;
   initiating a session between the untrusted device and the secure service associated with the cellular network;
   determining that the session has ended; and
   discontinuing the session.

2. The method as recited in claim 1, further comprising identifying the untrusted device as having only a single user interface, which is the voice user interface.

3. The method as recited in claim 1, further comprising:
   determining that a first location of the untrusted device is required;
   identifying a cellular device associated with the user identity;
   determining a second location of the cellular device; and
   assigning the second location of the cellular device as the first location of the untrusted device.

4. The method as recited in claim 1, further comprising:
   identifying a notification associated with the user identity; and
   transmitting the notification to the untrusted device during the session.

5. A system, comprising:
   a core cellular network that includes at least a user database and a gateway that connects the core cellular network to an external network;
   at least one secure application;
   the core cellular network further including an authentication module configured to:
      authenticate a user identity associated with the core cellular network, based at least in part on an audible authentication credential received from a voice user interface of an untrusted device, the untrusted device being unaffiliated with the core cellular network;
      transmit an authentication token to the untrusted device to initiate a session with the secure application, based at least in part on authenticating the audible authentication credential that is associated with the core cellular network; and
   wherein the gateway is further configured to discontinue access to the secure application when the session has ended.

6. The system as recited in claim 5, wherein the gateway is further configured to discontinue access to the secure application in response to detecting one or more of (i) a different user identity that is using the untrusted device; (ii) an "end session" command that was received; or (iii) a transaction associated with the user identity that was conducted in the core cellular network has completed.

7. The system as recited in claim 5, wherein:
   the user database correlates the user identity to a trusted device associated with the core cellular network, and is configured to locate the trusted device;
   the secure application requires a location associated with the user identity; and
   the core cellular network provides the location of the trusted device as the location of the user identity.

8. The system as recited in claim 5, wherein the core cellular network is further configured to provide alerts to a trusted device associated with the user identity; and
   wherein the core cellular network is further configured to forward the alerts to the untrusted device while the untrusted device is in communication with the core cellular network.

9. The system as recited in claim 5, wherein the secure application is a billing system or a data application.

10. One or more non-transitory computer-readable storage media containing computer-executable instructions that, when executed, perform operations that include:
    receiving, via a voice interface of a device, a request to access a cellular network, the device being unaffiliated with the cellular network;
    determining that the device is an untrusted device using a natural language interface;
    receiving, via the voice interface of the device, an audible authentication credential that is associated with the cellular network;
    authenticating a user identity that is associated with the cellular network, based at least in part on the audible authentication credential;
    transmitting an authentication token to the device to access the cellular network, based at least in part on authenticating the audible authentication credential that is associated with the cellular network and the request;
    initiating a session to access the cellular network;

determining that the session has ended; and
discontinuing the session.

11. The one or more non-transitory computer-readable storage media as recited in claim 10, further comprising:
   determining a trusted device associated with the user identity;
   identifying an alert to be transmitted to the trusted device; and
   transmitting the alert to the untrusted device.

12. The one or more non-transitory computer-readable storage media as recited in claim 10, further comprising:
   determining a requirement to identify a first location of the untrusted device;
   determining a trusted device associated with the user identity;
   determining a second location of the trusted device; and
   identifying the second location of the trusted device as the first location of the untrusted device.

13. The one or more non-transitory computer-readable storage media as recited in claim 10, further comprising:
   receiving an additional request to cause a cell phone associated with the user identity to ring;
   determining a number associated with the cell phone; and
   transmitting a signal to the cell phone to ring the cell phone.

14. The one or more non-transitory computer-readable storage media as recited in claim 10, wherein the request to access the cellular network corresponds to an access request for cellular network billing records associated with the user identity,
   wherein, initiating the session further comprises initiating the session with a billing server of the cellular network and identifying a cellular network billing account associated with the user identity, and
   wherein, determining that the session has ended further comprises determining that a user transaction with the billing server has been completed.

15. The one or more non-transitory computer-readable storage media as recited in claim 10, wherein the request to access the cellular network corresponds to an access request for cellular network data records associated with the user identity, and
   wherein, initiating the session further comprises initiating the session with a data server of the cellular network and identifying a cellular network data account associated with the user identity.

16. The method as recited in claim 1, wherein the verbal command is a first verbal command, further comprising:
   receiving, via the untrusted device, a second verbal command;
   analyzing the second verbal command to determine a second user identity that issued the second verbal command; and
   determining that the second user identity corresponds to another user who is different from the user identity that issued the first verbal command, and
   wherein, determining that the session has ended is based at least in part on the second user identity.

17. The method as recited in claim 1, wherein the verbal command is associated with locating a trusted device, and further comprising:
   identifying, via the cellular network, the trusted device and a phone number associated with the trusted device;
   determining that a ringtone associated with the trusted device is in an inactive state;
   transmitting a signal to the trusted device to adjust the inactive state to an active state, the active state being detectable by individuals proximate to the trusted device; and
   transmitting an audible ring command to the trusted device.

18. The method as recited in claim 17, wherein the verbal command is associated with locating the trusted device, and further comprising:
   determining a current location of the trusted device; and
   transmitting an additional signal to the untrusted device to audibly annunciate the current location of the trusted device.

19. The system as recited in claim 5, wherein the gateway is a first gateway, and further comprising:
   one or more enterprise servers that include at least a frontend server, wherein, the frontend server is configured to:
      determine whether the secure application requires access to a third-party services that have different security protocols relative to the secure application; and
      in response to determining the secure application requires access to the third-party services, establish a secure connection with the third-party services via a second gateway that is different to the first gateway, based at least in part on the different security protocols.

20. The one or more non-transitory computer-readable storage media of claim 10, further comprising:
   identifying a transaction associated with the cellular network that is to be completed, based at least in part on the request; and
   determining that the transaction has been completed, and
   wherein, determining that the session has ended is based at least in part on the transaction being completed.

* * * * *